United States Patent
Jang et al.

(10) Patent No.: US 9,140,840 B2
(45) Date of Patent: Sep. 22, 2015

(54) BACKLIGHT ASSEMBLY AND DISPLAY DEVICE

(71) Applicant: Samsung Display Co., Ltd., Yongin (KR)

(72) Inventors: Jae-Woo Jang, Cheonan-si (KR); Young-Rok Oh, Ansan-si (KR)

(73) Assignee: Samsung Display Co., Ltd., Yongin (KR)

( * ) Notice: Subject to any disclaimer, the term of this patent is extended or adjusted under 35 U.S.C. 154(b) by 291 days.

(21) Appl. No.: 13/909,592

(22) Filed: Jun. 4, 2013

(65) Prior Publication Data
US 2014/0204610 A1    Jul. 24, 2014

(30) Foreign Application Priority Data

Jan. 23, 2013  (KR) .......................... 10-2013-0007482

(51) Int. Cl.
*F21V 8/00* (2006.01)
(52) U.S. Cl.
CPC .................................... *G02B 6/0011* (2013.01)
(58) Field of Classification Search
USPC ................................. 362/97.1, 632, 633, 634
See application file for complete search history.

(56) References Cited

U.S. PATENT DOCUMENTS

| | | | |
|---|---|---|---|
| 7,570,314 B2 | 8/2009 | Lee | |
| 7,626,653 B2 | 12/2009 | Zensai | |
| 7,986,373 B2 | 7/2011 | Maruta | |
| 8,054,401 B2 | 11/2011 | Tsubokura et al. | |
| 2004/0246397 A1* | 12/2004 | Kang et al. | 349/58 |
| 2009/0122476 A1* | 5/2009 | Won et al. | 361/679.21 |
| 2009/0237586 A1* | 9/2009 | Han et al. | 349/58 |
| 2011/0261276 A1 | 10/2011 | Yu | |

FOREIGN PATENT DOCUMENTS

| | | |
|---|---|---|
| JP | 2006-267755 | 10/2006 |
| KR | 10-2005-0107213 | 11/2005 |
| KR | 10-2009-0042091 | 4/2009 |
| KR | 10-1014177 | 2/2011 |
| KR | 10-2011-0077272 | 7/2011 |
| KR | 10-1111910 | 1/2012 |
| KR | 10-2012-0036233 | 4/2012 |

* cited by examiner

*Primary Examiner* — Laura Tso
(74) *Attorney, Agent, or Firm* — H.C. Park & Associates, PLC

(57) ABSTRACT

Exemplary embodiments of the present invention relate to a backlight assembly and a display device, including a backlight unit including a light emitting diode (LED) light source of and a light guide, and a bottom chassis disposed at a rear surface of the backlight unit, wherein the bottom chassis includes a bottom chassis main body, an inner supporting member disposed at an inner surface of the bottom chassis main body, an outer supporting member disposed at an outer surface of the bottom chassis main body, and a fastener to fasten at least two of the bottom chassis main body, the inner supporting member, and the outer supporting member.

20 Claims, 10 Drawing Sheets

FIG. 6

| result Contour [Legend same] | reference (ref.) | conventional structure | FIG. 2 structure |
|---|---|---|---|
| twist amount [mm] | 10.3 | 20.3 | 15.0 |
| difference (vs. ref) | | 97% increasing | 46% increasing | twist amount decreasing by about 50% (strength increasing by 100%)

BACKLIGHT ASSEMBLY AND DISPLAY DEVICE

CROSS REFERENCE TO RELATED APPLICATION

This application claims priority from and the benefit of Korean Patent Application No. 10-2013-0007482, filed on Jan. 23, 2013, which is hereby incorporated by reference for all purposes as if fully set forth herein.

BACKGROUND

1. Field

Exemplary embodiments of the present invention relate to a backlight assembly and a display device.

2. Discussion of the Background

Various flat panel displays, such as a liquid crystal display (LCD), a plasma display panel (PDP), an organic light emitting diode (OLED) display, an electrowetting display (EWD), an electrophoretic display (EPD), an embedded microcavity display (EMD), and a nanocrystal display (NCD), have been developed.

A liquid crystal display (LCD) has advantages of a reduced size and weight compared to conventional cathode ray tube (CRT) display devices, and may have low power consumption. As a result, the liquid crystal display (LCD) is used in numerous information processing devices requiring a display. Conventionally, a liquid crystal display is a display device in which a differential voltage is applied to two electrodes in the LCD to generate an electric field, a liquid crystal material is injected between an upper substrate on which a common electrode, a color filter is formed, and a lower substrate on which a thin film transistor and pixel electrode are formed. By applying different potential voltages to the pixel electrode and the common electrode, an arrangement of liquid crystal molecules in the liquid crystal layer may be changed and/or controlled. Transmittance of light is adjusted through the change of the arrangement of the liquid crystal molecules to display an image on the display screen.

A liquid crystal display panel, in a liquid crystal display is a light receiving element which may not, by itself, emit light. Accordingly, the liquid crystal display may include a backlight unit for providing light to the liquid crystal display panel under the liquid crystal display panel.

The backlight unit is classified into an edge type of backlight unit, and a direct type of backlight unit according to a position of a light source of the backlight unit. The edge type of backlight unit, in which a light source is positioned in a side surface, transmits light provided from the light source to a display panel in an upper side by using a reflection sheet.

The liquid crystal display, including the backlight unit, is fixed and supported by a top chassis and a bottom chassis. The bottom chassis is positioned at a rear surface of the backlight unit and must have a predetermined angle to support and protect the liquid crystal display and not be bent. To support the LCD structure, the bottom chassis may have a protruding structure through a forming process.

However, the protruding structure may be difficult to manufacture according to the forming process. As the size of a display device increases, more support and strength is required to support the LCD structure. The strength of the LCD structure may decrease if the bottom chassis is twisted.

To reduce weight of the large sized display device, the bottom chassis is formed of a light metal such as aluminum. However, a strength of the LCD is not determined by only the forming process. Another problem is that the liquid crystal display and the backlight unit may not be adequately protected in the forming process.

The above information disclosed in this Background section is only for enhancement of understanding of the background and therefore it may contain information that does not form the prior art that is already known to a person of ordinary skill in the art.

SUMMARY

Exemplary embodiments of the present invention provide a backlight assembly and a display device having a bottom chassis that maintains strength of more than a predetermined degree in a large-sized display device.

Additional features of the invention will be set forth in the description which follows, and in part will be apparent from the description, or may be learned by practice of the invention.

Exemplary embodiments of the present invention provide a backlight assembly including, a backlight unit comprising a light emitting diode (LED) light source and a light guide, and a bottom chassis disposed at a rear surface of the backlight unit. The bottom chassis includes a bottom chassis main body, an inner supporting member that is disposed at an inner surface of the bottom chassis main body, an outer supporting member that is disposed at an outer surface of the bottom chassis main body, and a fastener to fasten. The fastener fastens at least two of the bottom chassis main body, the inner supporting member, and the outer supporting member.

Exemplary embodiments of the present invention also provide a display device including a display panel, a backlight unit providing a light to the display panel and including a light emitting diode (LED) light source and a light guide. A bottom chassis is disposed at a rear surface of the backlight unit, wherein the bottom chassis includes a bottom chassis main body, an inner supporting member disposed at an inner surface of the bottom chassis main body, an outer supporting member disposed at an outer surface of the bottom chassis main body. A fastening means is provided to fasten at least two of the bottom chassis main body, the inner supporting member, and the outer supporting member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 6 is a comparative chart of twisting amounts of a bottom chassis in various structures.

DETAILED DESCRIPTION OF THE ILLUSTRATED EMBODIMENTS

Figure 1:
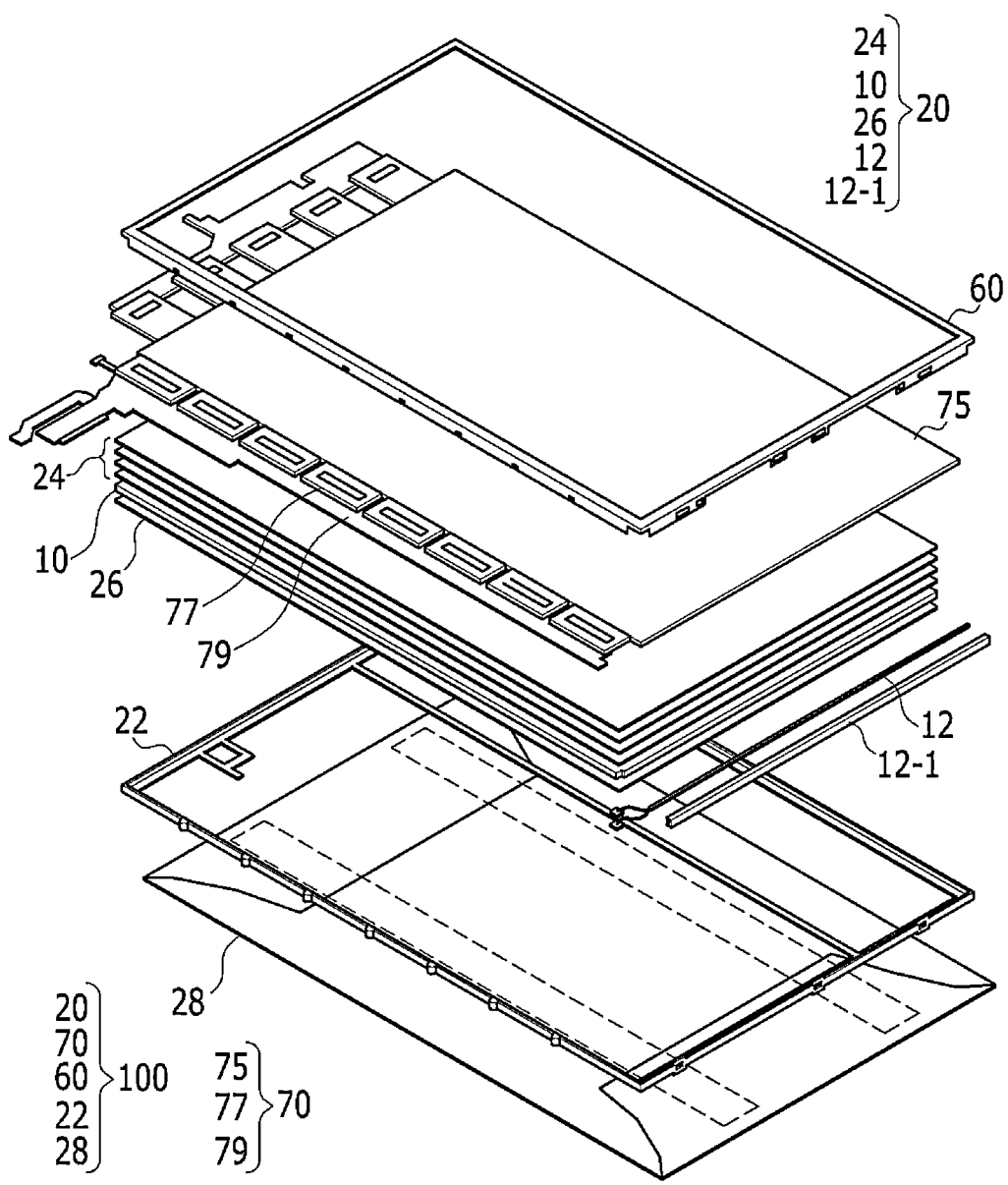
FIG. 1 is an exploded perspective view of a display device according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Hereinafter, exemplary embodiments of the present invention are described in detail with reference to the accompanying drawings.

A display device according to exemplary embodiments of the present invention will be described with reference to FIG. 1.

FIG. 1 is an exploded perspective view of a liquid crystal display.

Although the liquid crystal display 100 in FIG. 1 is shown with a backlight unit 20 and a bottom chassis 28, in some cases, a display device including a bottom chassis 28 without the backlight unit 20 may be provided.

Hereafter, the liquid crystal display 100 including the backlight unit 20 will be described hereinafter.

The liquid crystal display device 100 may include a top chassis 60 for fixing and supporting the backlight unit 20, the liquid crystal display panel assembly 70, a mold frame 22, and a bottom chassis 28. The backlight unit 20 may be a light source and the liquid crystal display panel assembly 70 may display an image after receiving light. The bottom chassis 28 may be positioned at a rear surface of the backlight unit 20, and the bottom chassis 28, the mold frame 22, and the backlight unit 20 collectively may be referred to as a backlight assembly.

The backlight unit 20 may provide light to the liquid crystal display panel assembly 70. The liquid crystal display panel assembly 70 positioned on the backlight unit 20 may provide a grayscale image by controlling light supplied by the backlight unit 20, so that an image may be displayed.

The liquid crystal display panel assembly 70 may include a liquid crystal display panel 75, an integrated circuit chip (IC chip) 77, and a flexible printed circuit (FPC) board 79.

The liquid crystal display panel 75 may include a TFT substrate including a plurality of thin film transistors (TFTs), an upper substrate positioned on the TFT substrate, and a liquid crystal layer injected between the TFT substrate and the upper substrate. The IC chip 77 may be mounted on the TFT substrate to control the liquid crystal display panel 75.

The TFT substrate may be a transparent insulating substrate on which the TFTs are formed in a matrix form. A data line may be connected to a source terminal of a TFT and a gate line may be connected to a gate terminal of a TFT. A pixel electrode formed of transparent indium tin oxide (ITO), as a conductive material, may be connected to a drain terminal of a TFT.

The data line and the gate line of the liquid crystal display panel 75 may be connected to the FPC board 79, so that when an electrical signal is input from the FPC board 79, the electrical signal may be transmitted to the source terminal and the gate terminal of the TFT. The TFT may be turned on or turned off according to a scan signal applied to the gate terminal through the gate line, and thus an image signal applied to the source terminal through the data line may be transmitted to the drain terminal or blocked. The FPC board 79 may receive an image signal from outside of (e.g., external to) the liquid crystal display panel 75, and may apply a driving signal to each of the data line and the gate line of the liquid crystal display panel 75. A pixel electrode may also be formed in the TFT substrate, and may be connected to the drain terminal.

An upper substrate may be disposed opposite to the TFT substrate. The upper substrate may be a substrate on which an RGB color filter, through which light passes so that a predetermined color is expressed, may be formed by a thin film process. Light from the backlight unit 20 may pass through the RGB color filter so that a predetermined color is provided by the LCD. A common electrode formed of ITO may be deposited on the color filter. When power is applied to the gate terminal and the source terminal of the TFT to turn the thin film transistor on, an electric field may be formed between the pixel electrode of the TFT substrate and the common electrode of the upper substrate. An arrangement angle of liquid crystal injected between the TFT substrate and the upper substrate may be changed by the electric field, and light transmittance may change according to the changed arrangement angle so that a desired image may be obtained.

The FPC board 79 may generate an image signal and a scan signal for driving the liquid crystal display device 100. A plurality of timing signals may also be generated by FPC board 79 for applying the signals at appropriate times, and may also apply the image signal and the scan signal to the gate line and the data line of the liquid crystal display panel 75.

It should be understood that various embodiments and variations of the liquid crystal display panels 75 may be utilized without departing from the invention. For example, in some cases, the common electrode or the color filter formed on the upper substrate may be formed on the TFT substrate. In some cases, the liquid crystal display device 100 may further include an additional printed circuit board, and the additional printed circuit board and the TFT substrate may be connected to each other by the FPC board 79.

A light receiving display panel according to exemplary embodiments of the present invention may also be used.

The backlight unit 20 for providing the liquid crystal display panel 75 with uniform light may be included under the liquid crystal display panel assembly 70 to be accommodated on the bottom chassis 28. A structure of the bottom chassis 28 will be described later.

The top chassis 60 may be formed on the liquid crystal display panel assembly 70 to prevent the liquid crystal display panel assembly 70 from being separated from the bottom chassis 28 while bending the FPC board 79 towards the outside of the mold frame 22.

The backlight unit 20 of the liquid crystal display device 100 may include one or more light sources 12, a light guide plate 10, a substrate 12-1, a reflection sheet 26, and an optical sheet. The light sources 12 may be fixed to the mold frame 22 to supply light to the liquid crystal display panel assembly 70. The substrate 12-1 may supply power to the light source 12. The light guide plate 10 may guide light emitted from the light source 12 to the liquid crystal display panel assembly 70. The reflection sheet 26 may be positioned on an entire surface of a lower portion of the light guide plate 10 to reflect light. The optical sheet 24 may obtain a luminance characteristic of the light from the light source 12 to provide the liquid crystal display panel assembly 70 with the obtained luminance characteristic. The optical sheet 24 may include at least one of various types of optical sheets, such as a prism sheet including a luminance improvement film for improving luminance or a prism structure and a diffuser sheet for uniformly diffusing light. In some cases, a light emitting diode (LED) may be used as the light source 12. The light emitting diode (LED) of the light source may be included in an edge type backlight unit 20 positioned at one side of the light guide 10. The light source 12 in FIG. 1 is arranged in one line, but light emitting diodes (LED) may be arranged in various manners including, for example, at constant intervals at one side of the light guide 10. The light source 12 may receive power from the power supply substrate 12-1. In some cases, the power supply substrate 12-1 may be omitted and the power may be received through other wires.

The structure of the bottom chassis 28 will be described in detail with reference to FIG. 2, FIG. 3, FIG. 4, and FIG. 5.

Figure 2:
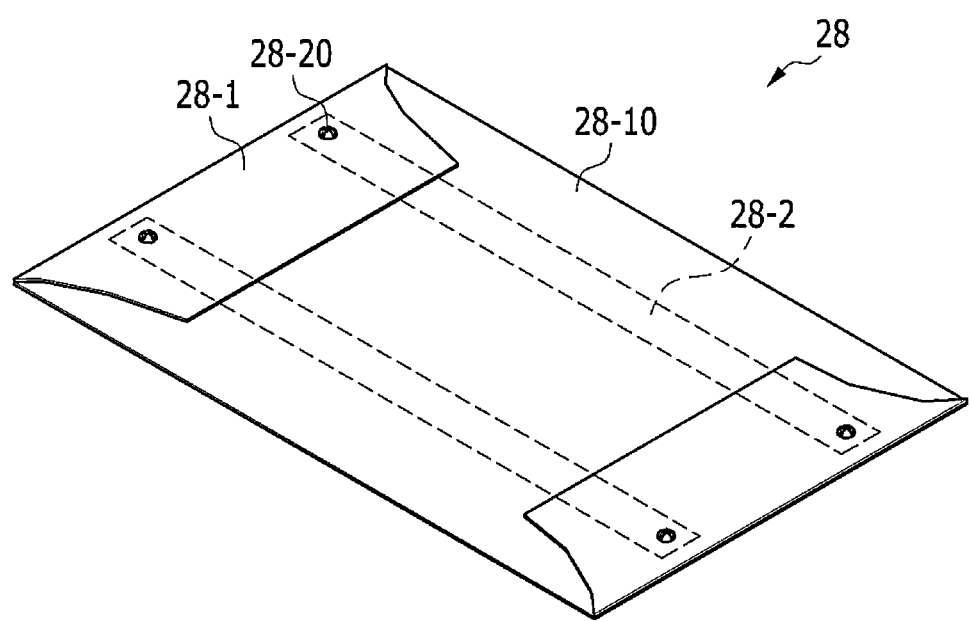
FIG. 2 is a perspective view showing a bottom chassis at an inner side according to exemplary embodiments of the present invention.
Figure 3:
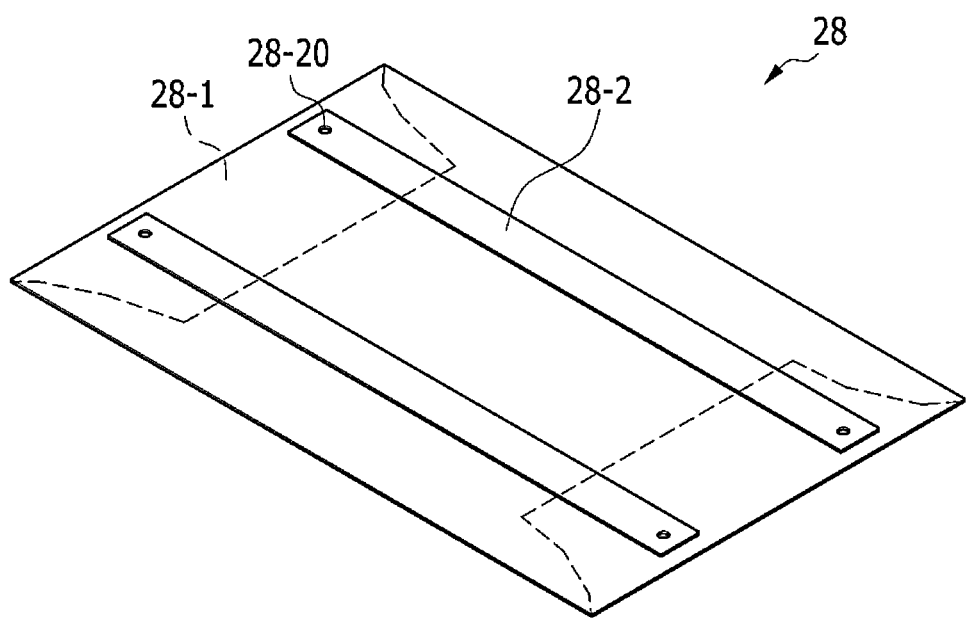
FIG. 3 is a perspective view showing a bottom chassis at an outer side according to exemplary embodiments of the present invention.
Figure 4:
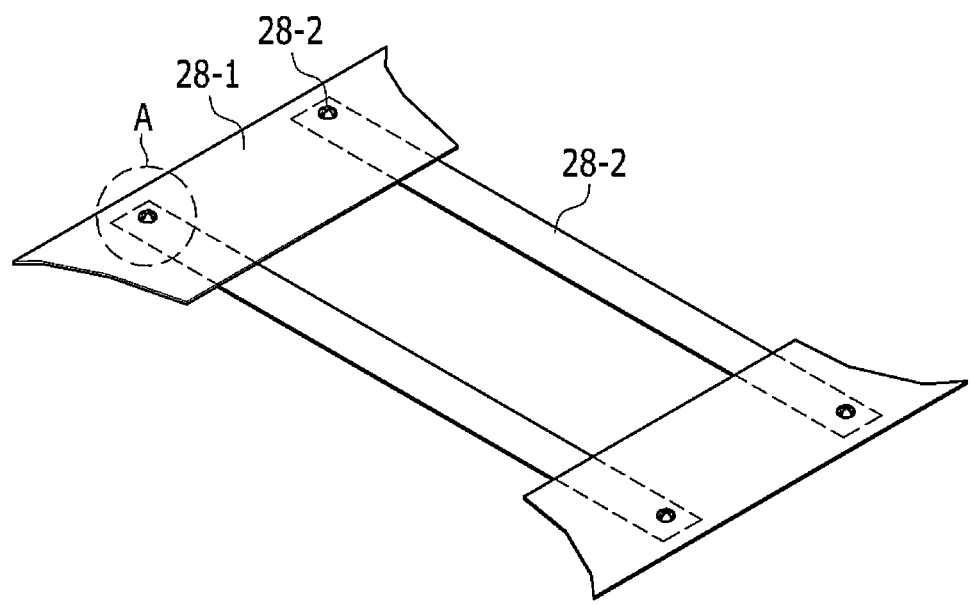
FIG. 4 is a view showing a supporting member of a bottom chassis according to exemplary embodiments of the present invention.
Figure 5:
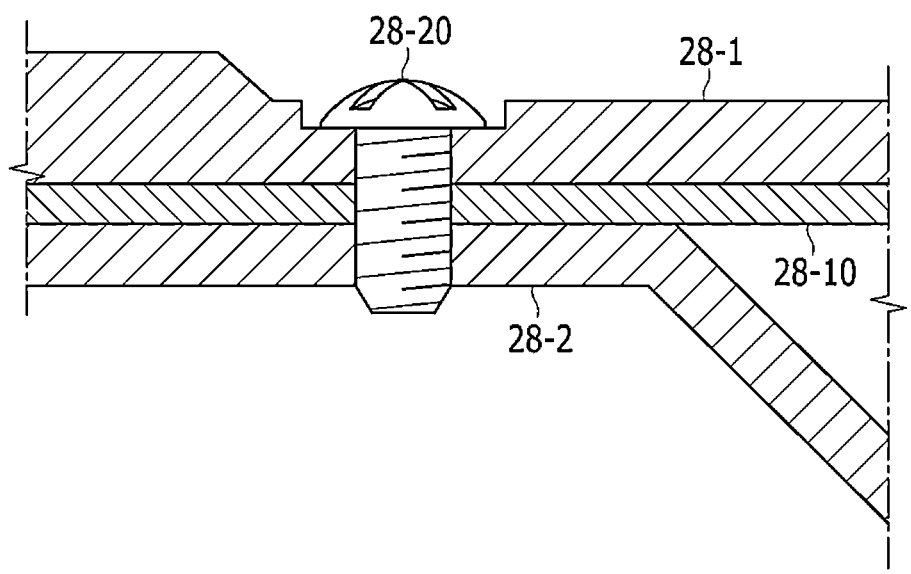
FIG. 5 is a cross-sectional view of a fastening structure in a bottom chassis according to exemplary embodiments of the present invention.

FIG. 2 is a perspective view showing the bottom chassis 28 at an inner side. FIG. 3 is a perspective view showing a bottom chassis 28 at an outer side. FIG. 4 is a view showing a supporting member of a bottom chassis 28. FIG. 5 is a cross-sectional view of a fastening structure in a bottom chassis 28.

The bottom chassis 28 may include a bottom chassis main body 28-10, an inner supporting member 28-1 (the first supporting member) positioned at an inner surface of the bottom chassis 28, and an outer supporting member 28-2 (the second supporting member) positioned at an outer surface. The inner surface may refer to a side of the bottom chassis 28 facing the center of the LCD 100. The outer surface may refer to a side of the bottom chassis facing away from the center of the LCD 100. The bottom chassis main body 28-10, the inner supporting member 28-1, and the outer supporting member 28-2 may be fastened by fastener 28-20. The fastener 28-20 may be a screw, however the fastener 28-20 is not limited thereto.

The bottom chassis main body 28-10 may have a plate structure in a rectangular shape corresponding to a plane structure of the backlight unit 20 and/or the liquid crystal panel assembly 70. The rectangular shape of the bottom chassis main body 28-10 may have a sufficient size for supporting and receiving the backlight unit 20. The bottom chassis main body 28-10 may be formed of a metal including, for example, aluminum (Al), and Steel, Electrogalvanized, Cold rolled, Coil (SECC) steel plate. A Steel Use Stainless (SUS) metal plate may be used in consideration of heat dissipation characteristics of the metal plate. The strength of the metal plate may be weakened as the size is increased, so to compensate for the weakening of the metal, a supporting member may be formed at both sides of the bottom chassis 28.

Hereinafter, the inner supporting member 28-1 will be described.

The inner supporting member 28-1 may be positioned at the inner surface of the bottom chassis main body 28-10, and may be positioned at two of the shorter sides of the rectangular-shaped bottom chassis main body 28-10. The inner supporting member 28-1 may have an edge (also referred to as a short edge side edge) corresponding to a length of a short edge of the bottom chassis main body 28-10. The short edge side edge may be positioned near the short edge of the bottom chassis main body 28-10. Referring to FIG. 2, the short edge side edge of the inner supporting member 28-1 may have the same length as the short edge of the bottom chassis main body 28-10 and may be positioned along the short edge.

The inner supporting member 28-1 may have a short edge side edge, a corresponding edge parallel to an extending direction of the short edge side edge, and a pair of side edges connecting the short edge side edge and the corresponding parallel edge. The corresponding parallel edge may be shorter than the short edge side edge. The pair of side edges may be symmetrical with respect to a line connecting the corresponding parallel edge and a center of the short edge side edge. The line connecting the corresponding parallel edge and the short edge side edge may be perpendicular to the extension direction. Each of the pair of side edges may have various structures and may be formed with a boundary that is bent at least two times in FIG. 2. The inner supporting member 28-1 may have a wide area near the short edge side edge, and a width of the inner supporting member 28-1 may gradually reduce away from the short edge side edge. The width of the inner supporting member 28-1 may gradually be reduced to further enhance the strength in the bottom chassis main body 28-10 and reduce potential for twisting of the bottom chassis 28.

The entire inner supporting member 28-1 may contact the bottom chassis main body 28-10. However, a portion of the inner supporting member 28-1 may include a protrusion to be separated from the bottom chassis main body 28-10.

The outer supporting member 28-2 may have a linear bar structure having a shorter length than the long edge of the bottom chassis main body 28-10. In some cases, the thicknesses of the inner supporting member 28-1, the outer supporting member 28-2, and the bottom chassis main body 28-10 may be the same. In some cases, at least one of the thicknesses of the inner supporting member 28-1, the outer supporting member 28-2, and the bottom chassis main body 28-10 may be different.

The outer supporting member 28-2 may be formed in a pair and may be disposed parallel to the long edge of the bottom chassis main body 28-10. Two outer supporting members 28-2 may be separated by a predetermined interval and may be positioned with the same interval from two long edges of the bottom chassis main body 28-10.

The entire outer supporting member 28-2 may contact the bottom chassis main body 28-10. However, a portion of the outer supporting member 28-2 may include a bent and protruded region separated from the bottom chassis main body 28-10. The bent and protruded region is shown through a cross-sectional view of FIG. 5.

In some cases, the inner supporting member 28-1 and the outer supporting member 28-2 may be formed with the same metal as the bottom chassis main body 28-10. In some cases, at least one of the inner supporting member 28-1, the outer supporting member 28-2, and the bottom chassis main body 28-10 may be formed of a different metal.

As shown in FIG. 4, the inner supporting member 28-1 and the outer supporting member 28-2 may enhance the bottom chassis main body 28-10 with a "$\Pi$" shape (e.g., conjoined double L shape). As a result, although the bottom chassis main body 28-10 may be formed of a light metal such as aluminum (Al), a twist in the bottom chassis 28 may be reduced and the strength may be improved.

The inner supporting member 28-1, the outer supporting member 28-2, and the bottom chassis main body 28-10 may be fastened by the fastener 28-20, as illustrated in FIG. 5.

Referring to FIG. 5, the fastener 28-20 may fix the inner supporting member 28-1 positioned at the inner surface and the outer supporting member 28-2.

The inner supporting member 28-1, the outer supporting member 28-2, and the bottom chassis main body 28-10 may include a hole, and may be attached to each other by using the fastener 28-20 through the corresponding holes.

A fastener 28-20 may respectively be formed at both ends of the outer supporting member 28-2. However, the number of fasteners 28-20 is not limited to two for each of the outer supporting members 28-2, and more than two fasteners 28-20 may be used.

According to exemplary embodiments of the present invention, the fastener 28-20 may be of various types, such as a screw, caulking, and an adhesive.

If the supporting member of the "$\Pi$" shape (e.g., conjoined double L shape) structure is formed at the inner side and the outer side of the bottom chassis main body 28-10, the strength of the bottom chassis 28 may improve and the twist may be reduced, as described in further detail with reference to FIG. 6.

FIG. 6 is a comparative chart of twisting amounts of a bottom chassis in various structures.

In FIG. 6, twist amounts in a reference bottom chassis structure, a conventional bottom chassis structure, and the structure of the bottom chassis in FIG. 2 are compared.

The reference structure may have a twist amount that is measured with reference to a bottom chassis in a direct type backlight unit having a light source and the display device. The light source in the direct type backlight unit may be positioned on the bottom chassis to enhance a strength of the bottom chassis such that a twist may be relatively low.

In the conventional bottom chassis structure, the bottom chassis may have a protruded structure according to a forming process. The bottom chassis may be made of aluminum, and may be formed as one unit. The structure of the bottom chassis 28 shown in FIG. 2 may also be formed of aluminum.

When one corner of the bottom chassis 28 is fixed and the other corner is twisted, twisted degrees may be indicated by different colors. A portion displayed with a red color means that the twist may be significant. A corner displayed with a blue color may be a fixed corner.

When measuring the twist, the twist of the direct type of backlight having the reference value may be lowest, and the structure of FIG. 2 may have the low twist in the edge type of backlight unit. Although the metal having weak strength, such as aluminum is used, the twist may be reduced and the strength of the bottom chassis 28 may be improved so that the bottom chassis 28 may be used in the large-sized display device.

Since a forming process does not exist additionally, the entire thickness of the bottom chassis 28 may be reduced and the twist of the bottom chassis 28 may be reduced through the outer and inner supporting members 28-2 and 28-1 in a large-sized display device. A strength of the large-sized display device may also be enhanced, and metal having the light weight and excellent heat dissipation characteristic such as aluminum may be used.

Exemplary embodiments of the present invention will be described with reference to FIG. 7, FIG. 8, FIG. 9, and FIG. 10.

Figure 7:
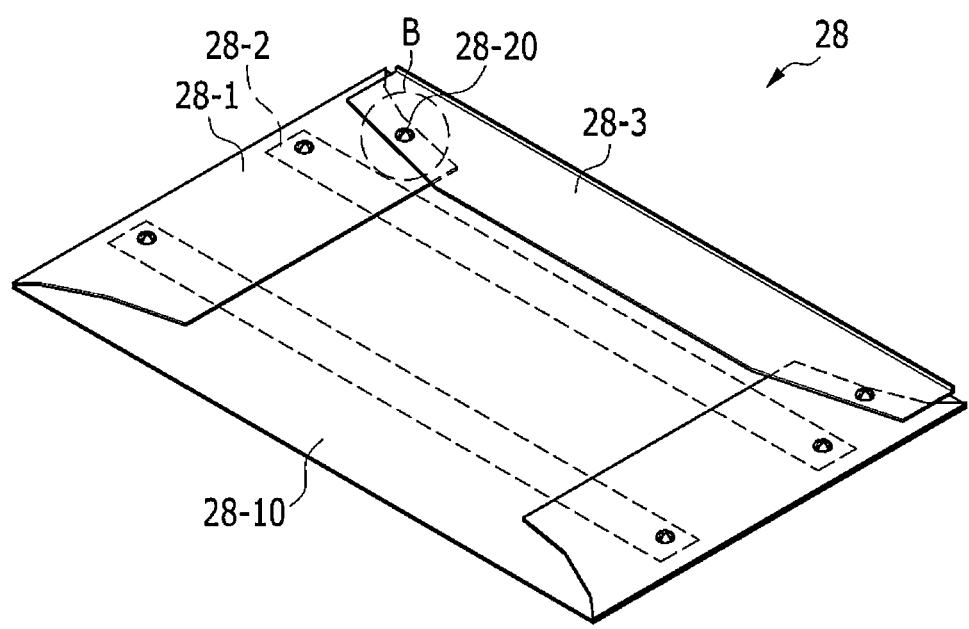
FIG. 7 is a perspective view of a bottom chassis according to exemplary embodiments of the present invention.
Figure 8:
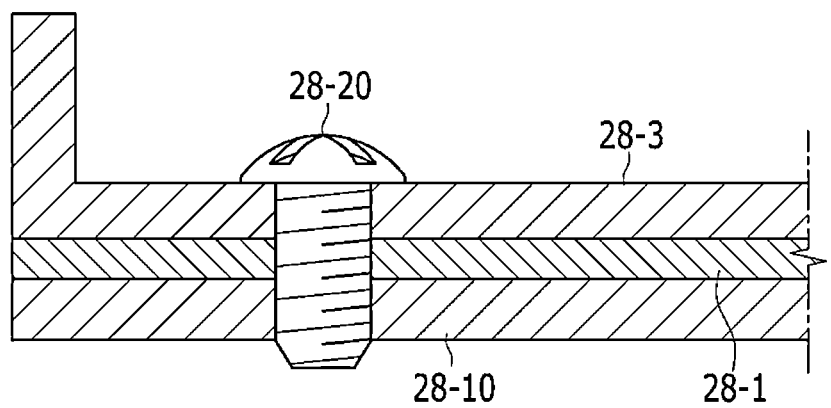
FIG. 8 is a cross-sectional view of a fastener in the bottom chassis according to exemplary embodiments of the present invention.

FIG. 7 is a perspective view of a bottom chassis 28. FIG. 8 is a cross-sectional view of a fastening means 28-20 in the bottom chassis 28 according to the exemplary embodiments of the invention.

The perspective view of FIG. 7 is of an inner side of the bottom chassis 28, and further includes an inner long edge supporting member 28-3.

The inner long edge supporting member 28-3 may be positioned at the inner surface of the bottom chassis main body 28-10, and may also be positioned near a long edge of the rectangular shape of the bottom chassis main body 28-10.

As shown in FIG. 8, the inner long edge supporting member 28-3 may have a bent structure thereby having a surface (horizontal surface) that partially contacts the inner supporting member 28-1 and a surface (protrusion surface) protruded toward the surface of the inner supporting member 28-1 and/or an inner surface of the bottom chassis main body 28-10. An edge where the protrusion surface and the horizontal surface of the inner long edge supporting member 28-3 meet is referred to as a bent edge. A surface of the inner long edge supporting member 28-3 may contact the bottom chassis main body 28-10 and inner supporting members 28-1.

In the inner long edge supporting member 28-3, the protrusion surface may be arranged in a direction perpendicular to the bottom chassis main body 28-10.

The bent edge of the inner long edge supporting member 28-3 may correspond to the length of the long edge of the bottom chassis main body 28-10, and may be positioned near the long edge of the bottom chassis main body 28-10. Referring to FIG. 7 and FIG. 8, the bent edge of the inner long edge supporting member 28-3 may have a shorter length than the long edge of the bottom chassis main body 28-10, and may be positioned along the long edge of the bottom chassis main body 28-10.

The horizontal plane of the inner long edge supporting member 28-3 may have a pair of side edges connecting the bent edge and a non-bent edge corresponding to the bent edge. The corresponding non-bent edge may be shorter than the bent edge and may be parallel to the extending direction of the bent edge. A line connecting centers of the bent and non-bent edges may be perpendicular to the extending direction. A pair of side edges may be symmetrical with respect to the line connecting the centers of bent edge and the corresponding non-bent edge. Each of the pair of side edges may have various structures, and, in some cases, may have a boundary that is bent at least two times, as shown in FIG. 7. The inner long edge supporting member 28-3 may have a wide width near the bent edge, and the width may be gradually reduced moving away from the bent edge. A portion of the horizontal surface of the inner long edge supporting member 28-3 may overlap a portion of the inner supporting member 28-1.

The structure of the bottom chassis 28 provides greater strength at the long edge of the bottom chassis main body 28-10 and reduces the occurrence of a twist in the bottom chassis 28.

The horizontal surface of the inner long edge supporting member 28-3 may contact the bottom chassis main body 28-10. However, a portion of the horizontal surface may be protruded to be separated from the bottom chassis main body 28-10. The inner long edge supporting member 28-3 may further reduce the twist because of the protrusion surface.

In some cases, the inner long edge supporting member 28-3 may be formed of the same metal as the bottom chassis main body 28-10. Various suitable metals may be used to form the inner long edge supporting member 28-3 including for example, aluminum (Al), SECC steel plate, and SUS metal plate. In some cases, the inner long edge supporting member 29-3 and the bottom chassis main body 28-10 may be formed of different metals.

In some cases, the inner long edge supporting member 28-3 may have the same thickness as the inner supporting member 28-1, the outer supporting member 28-2, and the bottom chassis main body 28-10. In some cases, at least one of the inner long edge supporting member 28-3, the inner supporting member 28-1, the outer supporting member 28-2, and the bottom chassis main body 28-10 may have a different thickness.

If a size of the inner long edge supporting member 28-3 is increased, the position of the outer supporting member 28-2 may be moved towards the center of the bottom chassis main body 28-10.

In some cases, the inner long edge supporting member 28-3 may be formed as a pair at two long edges of the bottom chassis main body 28-10.

The inner long edge supporting member 28-3 may be fixed to the bottom chassis main body 28-10 by the fastener 28-20. Referring to FIG. 8, the inner long edge supporting member 28-3 may be fixed by the fastener 28-20, along with the bottom chassis main body 28-10 and the inner supporting member 28-1.

In some cases, the inner long edge supporting member 28-3 may be fixed to one of the bottom chassis main body 28-10 and the inner supporting member 28-1 by the fastener 28-20.

Various types of fasteners 28-20 may be used including, for example, screws, caulking, and an adhesive.

Exemplary embodiments of the present invention will be described with reference to FIG. 9.

Figure 9:
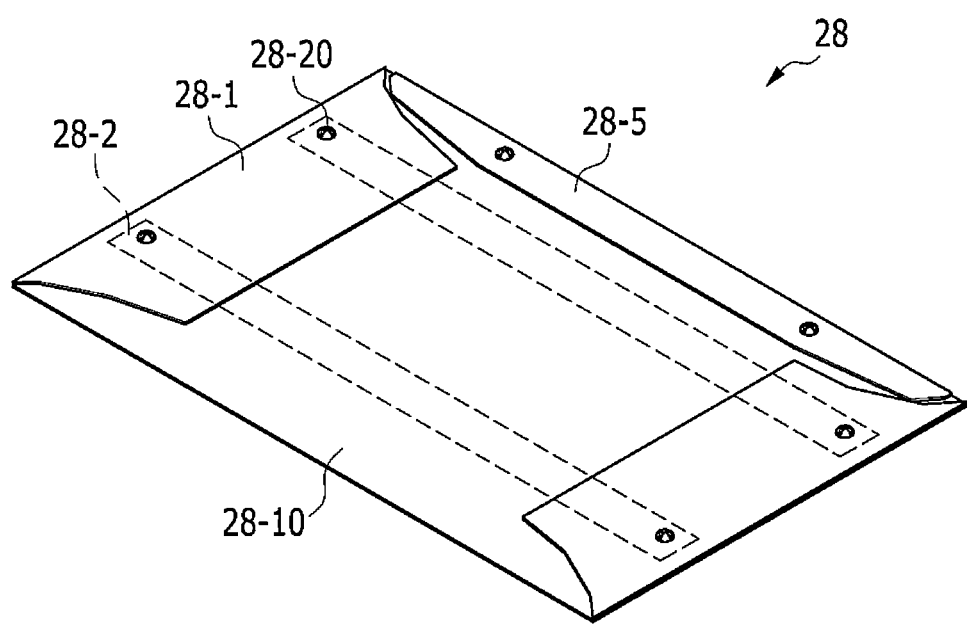
FIG. 9 and FIG. 10 are perspective views of a bottom chassis according to exemplary embodiments of the present invention.

FIG. 9 is a perspective view of an inner side of the bottom chassis 28, and differently from FIG. 2, an inner long edge supporting member 28-5 is further included. The exemplary embodiment of FIG. 9 is similar to the exemplary embodiments of FIG. 7, however the inner long edge supporting member 28-5 does not have the protrusion surface but has the horizontal surface, and a width of the horizontal surface is narrower than that of the exemplary embodiment of FIG. 7.

The inner long edge supporting member 28-5 may be positioned at the inner surface of the bottom chassis main body 28-10, and may be positioned near a long edge of the rectangular shape of the bottom chassis main body 28-10.

The inner long edge supporting member 28-5 may have a horizontal surface contacting the bottom chassis main body 28-10. An edge (a long edge side edge) of the horizontal surface corresponds to the length of the long edge of the bottom chassis main body 28-10, and the long edge side edge may be positioned near the long edge of the bottom chassis main body 28-10. Referring to FIG. 9, the long edge side edge of the inner long edge supporting member 28-5 may have a shorter length than the long edge of the bottom chassis main body 28-10 and may be positioned along the long edge of the bottom chassis main body 28-10.

The horizontal surface of the inner long edge supporting member 28-5 may have a pair of side edges connecting the long edge side edge of the inner long edge supporting member 28-5 and a corresponding edge of the inner long edge supporting member 28-5 corresponding to the long edge side edge. The corresponding edge may have a shorter structure than the long edge side edge and may be parallel to the extending direction of the long edge side edge. A line connecting centers of the long edge side edge and the corresponding edge may be perpendicular to the extending direction. A pair of side edges may be symmetrical with respect to the line connecting the centers of the long edge side edge and the corresponding edge. Each of the pair of side edges may have various structures, and in some cases, may be formed by a boundary that is bent at least two times, as shown in FIG. 9. The inner long edge supporting member 28-5 may have a wider width near the long edge side edge, and the width may be gradually reduced away from the long edge side edge. The width may be gradually reduced to further strengthen the portion of the bottom chassis 28 closer to the long edge of the bottom chassis main body 28-10 and to reduce occurrence of a twist in the bottom chassis.

The horizontal surface of the inner long edge supporting member 28-5 may contact the bottom chassis main body 28-10, but may not overlap the inner supporting member 28-1. However, in some cases, a portion of the horizontal surface may protrude to be separated from the bottom chassis main body 28-10.

In some cases, the inner long edge supporting member 28-5 may be formed of the same metal as the bottom chassis main body 28-10, for example, aluminum (Al), SECC steel plate, and SUS metal plate. In some cases, the inner long edge supporting member 28-5 and the bottom chassis main body 28-10 may be formed of different materials.

In some cases, the inner long edge supporting member 28-5 may have the same thickness as the inner supporting member 28-1, the outer supporting member 28-2, and the bottom chassis main body 28-10. In some cases, at least one of the inner long edge supporting member 28-5, the inner supporting member 28-1, the outer supporting member 28-2, and the bottom chassis main body 28-10 may have a different thickness.

In some cases, the inner long edge supporting member 28-5 may be respectively formed as a pair at two long edges of the bottom chassis main body 28-10.

The inner long edge supporting member 28-5 may also be fixed to the bottom chassis main body 28-10 by the fastener 28-20. Differently from FIG. 8, in FIG. 9, only the inner long edge supporting member 28-5 and the bottom chassis main body 28-10 may be fixed by the fastener 28-20.

Various types of suitable fasteners 28-20 may be used including, for example, fasteners such as screws, caulking, and an adhesive. It should be also understood that fasteners 28-20 may be used at various locations on the bottom chassis main body 28-10, and are not limited to any number or location.

Exemplary embodiments enhancing the outer supporting member 28-2 will be described with reference to FIG. 10.

Figure 10:
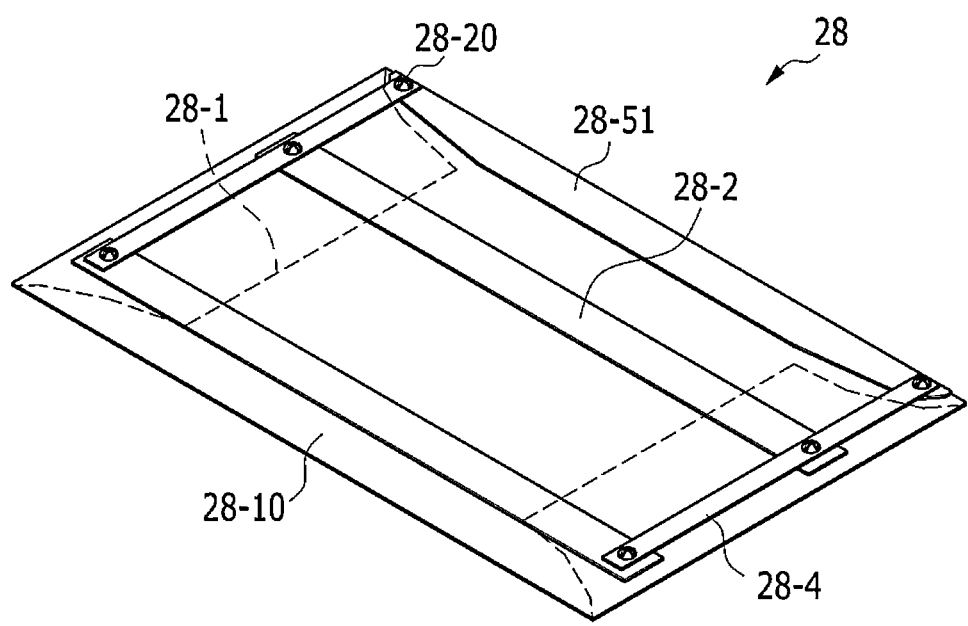

FIG. 10 is a perspective view of an outer side of the bottom chassis 28, and differently from FIG. 3, outer additional supporting members 28-4 and 28-51 are further included.

The outer addition supporting members 28-4 and 28-51 shown in FIG. 10 include an outer short edge supporting member 28-4 and an outer long edge supporting member 28-51.

The outer long edge supporting member 28-51 may be positioned at the outer surface of the bottom chassis main body 28-10, and may be positioned near a long edge of the rectangular shape of the bottom chassis main body 28-10.

The outer long edge supporting member 28-51 may correspond to the inner long edge supporting member 28-5 of FIG. 9, however the outer long edge supporting member 28-51 and the inner long edge supporting member 28-5 may be positioned on the other side of bottom chassis body 28-10 compared to the inner long edge supporting member 28-5.

The outer long edge supporting member 28-51 may have a horizontal surface contacting the bottom chassis main body 28-10. An edge of the horizontal surface (a long edge side edge) may be positioned near the long edge of the bottom chassis main body 28-10. Referring to FIG. 10, the long edge side edge of the outer long edge supporting member 28-51 may have a shorter length than the long edge of the bottom chassis main body 28-10, and may be positioned along the long edge.

The horizontal surface of the outer long edge supporting member 28-51 may have a pair of side edges connecting a corresponding edge of the outer long edge supporting member 28-51 to the long edge side edge. The corresponding edge may be a shorter than the long edge side edge and may be parallel to the extending direction of the long edge side edge. A line connecting centers of the long edge side edge and the corresponding edge may be perpendicular to the extending direction. The pair of side edges may be symmetrical with respect to the line connecting the centers of the long edge side edge and the corresponding edge. Each of the pair of the side edges may have various structures, and, in some cases, may be formed of a boundary that is bent at least two times, as shown in FIG. 10. The outer long edge supporting member 28-51 may have a wider width near the long edge side edge, and the width may be gradually decreased away from the long edge side edge. The width may be gradually decreased to strengthen the long edge of the bottom chassis main body 28-10 and to reduce occurrence of a twist in the bottom chassis 28.

The horizontal surface of the outer long edge supporting member 28-51 may contact the bottom chassis main body 28-10 and may not overlap the outer supporting member 28-2. However, a portion of the horizontal surface may be protruded to be separated from the bottom chassis main body 28-10.

In some cases, the outer long edge supporting member 28-51 may be formed of the same metal as the bottom chassis main body 28-10. For example, in some cases, the outer long edge supporting member 28-51 and the bottom chassis main body 28-10 may be formed of a metal, such as aluminum (Al), SECC steel plate, and SUS metal plate. In some cases, the outer long edge supporting member 28-52 and the bottom chassis main body 28-10 may be made of different materials.

In some cases, the outer long edge supporting member 28-51 may be formed as a pair at two long edges of the bottom chassis main body 28-10.

The outer short edge supporting member 28-4 may have the linear bar structure like the outer supporting member 28-2 but may have a shorter length than the short edge of the bottom chassis main body 28-10.

The outer short edge supporting member 28-4 may be formed as a pair, and may be disposed parallel to the short edge of the bottom chassis main body 28-10. Two outer short edge supporting members 28-4 may be separated by a predetermined interval and may be positioned with the same interval from two short edges of the bottom chassis main body 28-10.

The outer short edge supporting member 28-4 may overlap the outer supporting member 28-2 and the outer long edge supporting member 28-51. In FIG. 10, the outer short edge supporting member 28-4 may be disposed to overlap the outer long edge supporting member 28-51 at the edges of the outer long edge supporting member 28-51. The outer short edge supporting member 28-4 may be disposed to also overlap the outer supporting member 28-2 at edges of the outer supporting member 28-2. However, the outer short edge supporting member 28-4 may be disposed at various positions.

In some cases, the inner long edge supporting member 28-4 may be formed of the same metal as the bottom chassis main body 28-10 including, for example, aluminum (Al), SECC steel plate, and SUS metal plate. In some cases, the inner long edge supporting member 28-4 and the bottom chassis main body 28-10 may be formed of different metals. The metal forming the inner long edge supporting member 28-4 may be selected based upon the desired heat dissipation characteristics, which may be determined by a manufacturer of the LCD.

The outer long edge supporting member 28-51 and the outer short edge supporting member 28-4 may be fixed to the bottom chassis main body 28-10 by the fastener 28-20. In FIG. 10, the fastener 28-20 may be formed at a position where the outer short edge supporting member 28-4 overlaps the outer long edge supporting member 28-51 and/or the outer supporting member 28-2.

The inner supporting member 28-1 may be fixed to the bottom chassis main body 28-10, the outer short edge supporting member 28-4, and the outer supporting member 28-2 by the fastener 28-20 at the portion where the outer short edge supporting member 28-4 overlaps the outer supporting member 28-2.

The bottom chassis main body 28-10, the outer short edge supporting member 28-4, and the outer long edge supporting member 28-51 may be fixed by the fastener 28-20 at the portion where the outer short edge supporting member 28-4 overlaps the outer long edge supporting member 28-51.

Various fasteners 28-20 may be used including, for example, a screw, caulking, and an adhesive. The position of the fastener 28-20 may also vary.

In some cases, only one of the outer short edge supporting member 28-4 and the outer long edge supporting member 28-51 may be added.

In some cases, the outer short edge supporting member 28-4 and the outer long edge supporting member 28-51 may have the same thickness as the inner supporting member 28-1, the outer supporting member 28-2, and the bottom chassis main body 28-10. In some cases, at least one of the outer short edge supporting member 28-4, the outer long edge supporting member 28-51, the inner supporting member 28-1, the outer supporting member 28-2, and the bottom chassis main body 28-10 may have a different thickness.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight assembly, comprising:
a backlight unit comprising a light source and a light guide; and
a bottom chassis disposed at a rear surface of the backlight unit,
wherein the bottom chassis comprises:
  a bottom chassis main body;
  an inner supporting member disposed at an inner surface of the bottom chassis main body;
  an outer supporting member disposed at an outer surface of the bottom chassis main body; and
  a fastener to fasten at least one of the inner supporting member and the outer supporting member to the bottom chassis main body.

2. The backlight assembly of claim 1, wherein:
the inner supporting member is disposed at a short edge side of the bottom chassis main body.

3. The backlight assembly of claim 2, wherein:
the outer supporting member overlaps the inner supporting member and extends parallel to a long edge of the bottom chassis main body.

4. The backlight assembly of claim 3, wherein:
a pair of the inner supporting members and a pair of the outer supporting members are disposed in a conjoined double L shape.

5. The backlight assembly of claim 3, further comprising:
an inner long edge supporting member disposed at the inner surface of the bottom chassis main body,
wherein the inner long edge supporting member is disposed at a long edge side of the bottom chassis main body.

6. The backlight assembly of claim 5, wherein:
the inner long edge supporting member overlaps the inner supporting member.

7. The backlight assembly of claim 5, wherein:
the inner long edge supporting member has a protrusion surface protruding toward the inner surface of the bottom chassis main body.

8. The backlight assembly of claim 3, further comprising:
an outer long edge supporting member disposed at the outer surface of the bottom chassis main body,
wherein the outer long edge supporting member is disposed at the long edge side of the bottom chassis main body.

9. The backlight assembly of claim 3, further comprising:
an outer short edge supporting member disposed at the outer surface of the bottom chassis main body,
wherein the outer short edge supporting member overlaps the outer supporting member.

10. The backlight assembly of claim 3, wherein:
the fastener comprises one of a screw, an adhesive, and a caulking.

11. The backlight assembly of claim 3, wherein:
at least one of the bottom chassis main body, the inner supporting member, and the outer supporting member is formed of one of aluminum (Al), Steel, Electrogalvanized, Cold rolled, Coil (SECC) steel plate, and Steel Use Stainless (SUS) metal plate.

12. A display device, comprising:
a display panel;
a backlight unit comprising a light source and a light guide, the backlight unit configured to provide a light to the display panel; and
a bottom chassis disposed at a rear surface of the backlight unit,
wherein the bottom chassis comprises:
  a bottom chassis main body;
  an inner supporting member disposed at an inner surface of the bottom chassis main body;
  an outer supporting member disposed at an outer surface of the bottom chassis main body; and
  a fastener to fasten at least one of the inner supporting member and the outer supporting member to the bottom chassis main body.

13. The display device of claim 12, wherein:
the inner supporting member is disposed at a short edge side of the bottom chassis main body.

14. The display device of claim 13, wherein:
the outer supporting member overlaps the inner supporting member and extends parallel to a long edge of the bottom chassis main body.

15. The display device of claim 14, wherein:
a pair of the inner supporting members and a pair of the outer supporting members are formed in a conjoined double L shape.

16. The display device of claim 14, further comprising:
an inner long edge supporting member disposed at the inner surface of the bottom chassis main body,
wherein the inner long edge supporting member is disposed at a long edge side of the bottom chassis main body.

17. The display device of claim 16, wherein:
the inner long edge supporting member overlaps the inner supporting member.

18. The display device of claim 16, wherein:
the inner long edge supporting member has a protrusion surface protruding toward the inner surface of the bottom chassis main body.

19. The display device of claim 14, further comprising:
an outer long edge supporting member disposed at the outer surface of the bottom chassis main body,
wherein the outer long edge supporting member is disposed at the long edge side of the bottom chassis main body.

20. The display device of claim 14, further comprising:
an outer short edge supporting member disposed at the outer surface of the bottom chassis main body,
wherein the outer short edge supporting member overlaps the outer supporting member.

* * * * *